(12) United States Patent
Brenninger

(10) Patent No.: US 9,045,129 B2
(45) Date of Patent: Jun. 2, 2015

(54) ENGINE CONTROL SYSTEM

(75) Inventor: Martin Brenninger, Marktoberdorf (DE)

(73) Assignee: AGCO INTERNATIONAL GmbH, Neuhausen am Rheinfall (CH)

(*) Notice: Subject to any disclaimer, the term of this patent is extended or adjusted under 35 U.S.C. 154(b) by 0 days.

(21) Appl. No.: 14/128,237

(22) PCT Filed: Jun. 12, 2012

(86) PCT No.: PCT/EP2012/061101
§ 371 (c)(1),
(2), (4) Date: Apr. 2, 2014

(87) PCT Pub. No.: WO2013/000702
PCT Pub. Date: Jan. 3, 2013

(65) Prior Publication Data
US 2014/0214290 A1 Jul. 31, 2014

(30) Foreign Application Priority Data

Jun. 30, 2011 (GB) .................................. 1111291.9

(51) Int. Cl.
G06F 7/00 (2006.01)
B60W 10/06 (2006.01)
F02D 41/02 (2006.01)

(52) U.S. Cl.
CPC ........... B60W 10/06 (2013.01); F02D 41/0205 (2013.01); F02D 41/021 (2013.01); F02D 41/0225 (2013.01)

(58) Field of Classification Search
CPC .............. F02D 41/021; F02D 41/0205; F02D 41/0225; B60Q 10/06
See application file for complete search history.

(56) References Cited

U.S. PATENT DOCUMENTS

| 5,081,443 | A | 1/1992 | Breit | |
|---|---|---|---|---|
| 5,546,308 | A | 8/1996 | Yamamoto | |
| 6,144,295 | A * | 11/2000 | Adams et al. | 340/442 |
| 6,604,416 | B2 * | 8/2003 | Tsujita | 73/146.5 |
| 7,224,267 | B1 | 5/2007 | Ellis | |
| 7,292,915 | B2 * | 11/2007 | Koike | 701/1 |
| 2003/0164033 | A1 | 9/2003 | Ghabra et al. | |
| 2004/0021561 | A1 | 2/2004 | Sasaki et al. | |

FOREIGN PATENT DOCUMENTS

| CN | 102050096 A | 5/2011 |
|---|---|---|
| DE | 4014378 A1 | 11/1991 |
| EP | 2101054 A2 | 9/2009 |
| GB | 952374 A | 3/1964 |
| GB | 2471478 A | 1/2011 |

OTHER PUBLICATIONS

International Search Report for International Application No. PCT/EP2012/061101 dated Jun. 12, 2012.
GB Search Report for GB Application No. 1111291.9 dated Oct. 14, 2011.

* cited by examiner

Primary Examiner — David D Le

(57) ABSTRACT

An engine control system for changing engine speed on an agricultural vehicle. The system includes a vehicle control unit for controlling an engine and a transmission mounted within the vehicle, and a tire control unit for detecting the pressure of at least one tire and wherein the engine speed is automatically changed upon detection of an adjustment of the tire pressure.

9 Claims, 1 Drawing Sheet

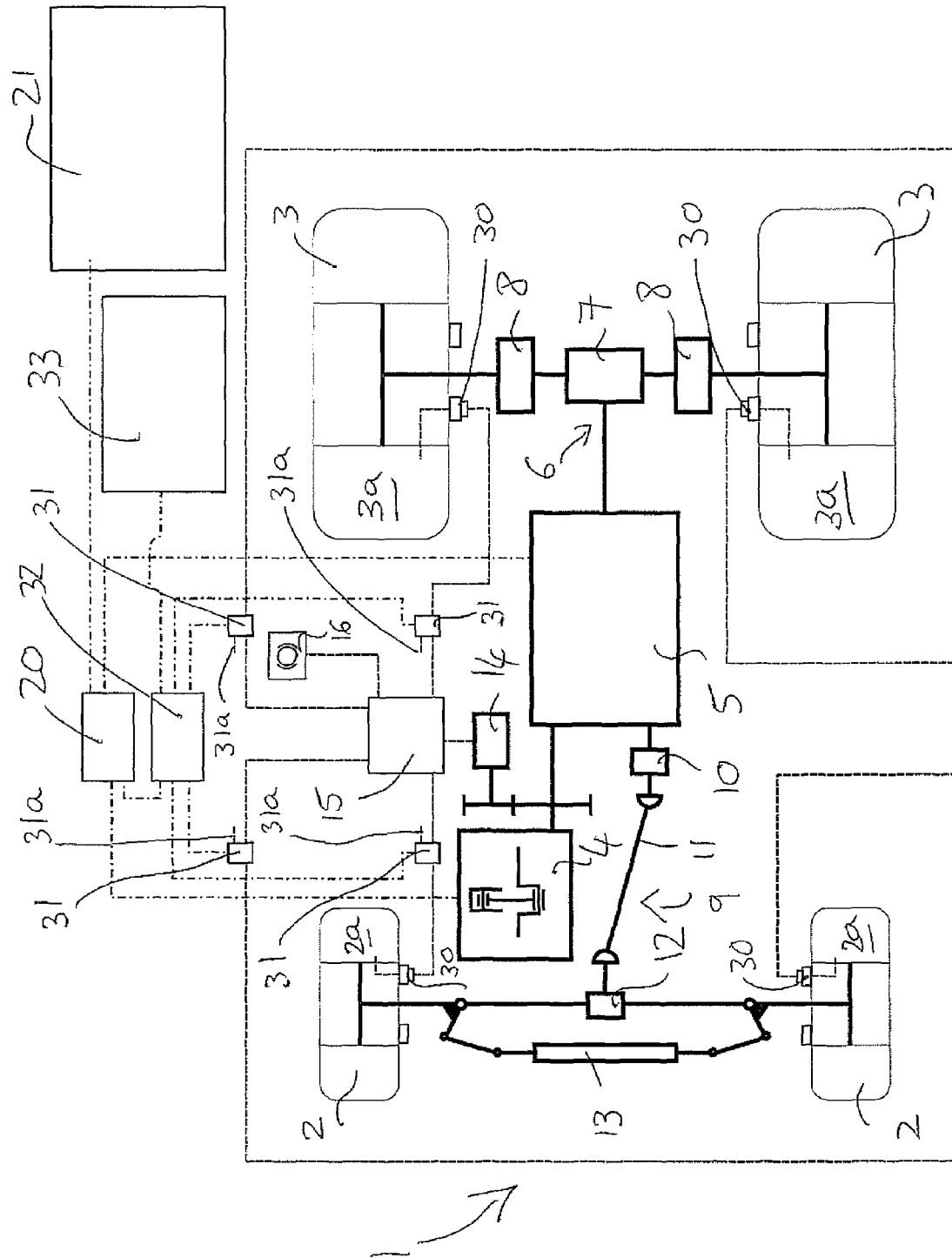

ENGINE CONTROL SYSTEM

BACKGROUND OF THE INVENTION

1. Field of Invention

This invention relates to an engine control system for changing the engine speed on an agricultural vehicle in response to a change in tyre pressure. More specifically the invention relates to such an engine control system on an agricultural tractor.

2. Description of Related Art

An agricultural tractor is used both on roads and in fields. The tyre pressure necessitated for work on a field is low, roughly 0.8 bar. The tyre pressure required on road is higher, roughly 2 bar.

Some agricultural tractors are fitted with an automatic control system which allows the driver to set the vehicle speed (that is the speed over ground) and other parameters associated with the vehicle whilst the control system automatically changes the engine speed and the transmission ratio simultaneously to reach the desired vehicle speed. Such a system reduces fuel consumption.

Field work may require high power and therefore the engine speed may be high, for example 2100 rpm. If the driver then returns to the road, with the automatic control system activated, the system would decrease the engine speed to roughly 1750 rpm. Since the tractor has moved from the field to the road, it is necessary to increase the tyre pressure. Since the air for the tyre pressure control is supplied by an on board compressor which is driven directly by the engine, the performance of the compressor is decreased and as a result it takes longer to inflate the tyres than if the engine speed was the same as that on the field. The driver must therefore remember to deactivate the automatic control system when inflating the tyres and re-activate it when inflation has finished. Often this can be forgotten.

It as an aim of the invention to provide an engine control system which overcomes the aforementioned problems.

OVERVIEW OF THE INVENTION

According to the invention there is provided an engine control system as set out in claim 1. Preferred features of the invention are set out in the dependent claims.

BRIEF DESCRIPTION OF THE DRAWINGS

The invention will now be described, by way of example only with reference to FIG. 1 which is a circuit diagram showing a driveline on an agricultural tractor provided with an engine control system in accordance with the invention.

DETAILED DESCRIPTION OF THE INVENTION

FIG. 1 shows a driveline of a tractor 1 having steerable front wheels 2, rear wheels 3, a combustion engine 4, a transmission 5 and a rear wheel driveline 6. The rear wheel driveline 6 comprises a rear differential 7 and brakes 8. A front wheel driveline 9 comprises an all wheel drive clutch 10, a cardan driveline 11 and a front differential 12. A steering cylinder 13 pivots front wheels 2.

An air compressor 14 supplies air to an air supply system 15. The air supply system 15 may comprise an air dryer, air reservoir and other components as described in the applicant's previous patent applications GB 0911309.3 and GB 0922016.1. Air compressor 14 is directly driven by engine 4 with a constant ratio. A brake system 16 is supplied by air supply system 15.

Combustion engine 4 and transmission 5 are controlled by a tractor or vehicle control unit 20. The control unit 20 is connected to a tractor main display 21 for input and display of information. To reduce fuel consumption, the driver can select TMS (Tractor Management System) which is an automated mode which means that the vehicle control unit 20 reduces the speed of the engine 4 and simultaneously adapts the ratio of the transmission 5 to keep the ground vehicle speed constant. As the driveline of the front wheels is connected with the driveline of the rear wheels by a fixed gear ratio, consideration of the rear wheel driveline is sufficient to explain how TMS works.

If the speed over ground of the vehicle $v_v$ is desired to be 50 km/h and the effective perimeter $U_w$ of the rear wheel is about 5,555 meters, the rear wheel rotation speed $n_w$ must be about 150 rpm:

$$n_w = v_v / U_w = 50\,000 \text{ m/h } 5{,}555 \text{ m } 60 = 150 \text{ rpm}$$

The drive torque of the combustion engine 4 is transmitted via the transmission 5 (of a CVT type) to the front wheel 2 and rear wheels 3.

Between the transmission 5 and the rear wheels 3 the overall ratio is constant and can be taken as $i_G = 32.97$.

The output rotation speed $n_T$ of the transmission 5 is calculated by the formula:

$$n_T = i_G \times v_v / U_w = 4.956 \text{ rpm}$$

and must be kept constant to achieve a constant speed over ground of 50 km/h.

Presuming that engine speed of the combustion engine 4 is equal to the input speed into transmission 5 and is at its maximum of $n_{Emax} = 2.200$ rpm, the current value of the variable gear ratio of transmission $i_{T1}$ 5 is:

$$i_{T1} = n_{Emax} / n_T = 0.44$$

If TMS reduces engine speed to a minimum value $n_{Emin} = 1750$ rpm, the gear ratio of transmission 5 must be adjusted to:

$$i_{T2} = n_{Emin} / n_T = 0.35$$

to keep vehicle speed constant. This adjustment is especially advantageous when having a CVT type transmission but may also be realised by a stepped, automatically shifted transmission used in tractors or trucks.

As air compressor 14 is drivingly connected to the engine 4 with a ratio of $i_c = 1{,}116$, performance of the air compressor 14 varies with engine speed:

At maximum engine speed $n_{Emax} = 2200$ rpm, compressor speed is $n_{c1} = 2.200 \times 1{,}116 = 2.455$ rpm resulting in an air delivery of 490 l/min.

At minimum engine speed $n_{Emin} = 1.750$ rpm, compressor speed is $n_{c1} = 1.750 \times 1{,}116 = 1953$ rpm resulting in an air delivery of 415 l/min. So a reduction of engine speed caused by TMS reduces the rate of air delivery by compressor 14 by about 15%.

To adjust the tyre pressure, the vehicle is equipped with a tyre pressure control system (TPCS) which comprises steerable front wheels 2 and non steerable rear wheels 3. Wheels 2, 3 are equipped with a rotary feed through arrangement 30 to guide air from the chassis to the wheels 2, 3 and then into tyre volumes 2a, 3a. The figure shows a feed through arrangement 30 where a supply system and tyre volume 2a, 3a are connected all the time. Alternative feed through arrangements are described in the applicant's patent application Nos. GB 1016662.7, GB. 0 1016661.9, GB 1021928.5, GB 1021929.3, GB1016662.7.

Each wheel has a respective control valve 31 to inflate or deflate tyre volumes 2a, 3a. For deflation, air is discharged from tyre volume 2a, 3a to the outside via discharge outlet 31a of each valve. Inflation is provided by connecting supply system 15 to the tyre volumes 2a, 3a.

Each control valve 31 is controlled by a tyre TPCS control unit 32. TPCS tyre control unit 32 is connected to vehicle control unit 20 or alternatively may be integrated in vehicle control 20.

TPCS control unit 32 is connected to a TPCS display 21 for the input of, for example, a set tyre pressure value and for the display of information. TPCS display 21 may also be integrated in tractor main display 21 as described in the applicant's patent application No. GB 0916233.3.

The tractor maybe operated under various different modes which affects how the engine control system of the present invention functions. These modes are explained below:

Mode 1: Tractor Management System (TMS)

The tractor may be driven in TMS mode for low fuel consumption. On the field, the tractor may operate with a tyre pressure of, for example, 0.8 bar. After field operation, the operator (or an automatic system) will want to increase tyre pressure to about 2 bar. As the TMS setting has reduced engine speed to around 1750 rpm, the air compressor has a reduced speed of 1953 rpm resulting in an air delivery of 415 l/min. The operator may recognise this and deactivate TMS and manually increase engine speed by using an electronic hand throttle. This is uncomfortable and may result in the driver forgetting to re-activate TMS again after inflation.

The engine control system of the present invention will preferably automatically de-activate the TMS function and increase engine speed, to 2200 rpm for example, which will result in a higher air compressor speed of around 2455 rpm and an air delivery of 490 l/min. This will save about 15% of the tyre inflation time due to the approximate linear relation between compressor speed/air delivery and the tyre inflation time. After reaching the set tyre pressure value, TMS is activated again and the engine speed will return to the speed it was before TMS was de-activated.

The tractor may have other automatic driveline controls which need to be taken into account if the engine control system of the present invention is used which are for example:

Mode 2: Engine Overloading

In vehicles with automatically shifted, stepped transmissions, and CVT transmissions, the operator can set up engine overloading. In this mode the engine speed is allowed to be reduced by load until a specified speed is reached before shifting to the next gear/or adjusting gear ratio. When the engine control system of the present invention is used whilst the tractor is in this mode, the engine control system preferably deactivates operation of the tractor in this mode.

As with TMS mode, when the set tyre pressure is reached the engine speed will return to the speed it was before the engine overloading mode was deactivated.

There are also vehicle operating modes wherein an automatic increase of the engine speed may cause undesirable operation of the vehicle or damage for components. Among these modes are:

Mode 3: Constant PTO

If an implement is attached to the PTO (power take off shaft) the PTO will require a constant power. In this case if an increase in tyre pressure is made, the automated engine control system of the present invention may not result in an increase in engine speed. For the TPCS this may result in lower performance but ensure tractor operation. So, when the PTO mode is in use the engine control system of the present invention will preferably be de-activated.

Mode 4: Coast Operation

When a vehicle is going downhill, the vehicle weight keeps the engine in rotational movement. This is known as a coast or pull mode and may result in an increase in engine speed. This mode is detected by, for example, an increase in engine speed without an increase in fuel injection, or alternatively by means associated with the CVT transmission as described in applicant's patent application No GB 0800613.2.

To protect the engine from obtaining a high engine speed (for example 2600 rpm) which could cause damage, the transmission is downshifted/adjusted to brake the vehicle. The higher the engine speed in coast operation, the earlier the driver must manually decelerate the vehicle by using the service brake/park system or engine brake. In this mode an automatic increase of the engine speed by the engine control system in accordance with the invention may cause an unexpected vehicle acceleration.

So in this mode, it is not desirable that the engine control system increases the engine speed to improve tyre inflation as this would then require action by the operator to reduce the engine speed. Instead, the engine control system according the present invention will preferably be de-activated under coast operation mode.

The engine control system of the present invention preferably checks the mode the tractor is operating in before it changes the engine speed. The tractor mode is registered with the vehicle control unit and the TCPS control unit checks the mode with the vehicle control unit before increasing engine speed.

The engine control system may advantageously reduce engine speed to a default setting after a tyre pressure limit is reached.

It is envisaged that there may be other modes beside those already described which require an automatic increase of the engine speed whilst adjusting tyre pressure. Further, there may be additional modes of vehicle operation which prohibit an engine speed increase which lie within the scope of the present invention.

In the shown embodiment, the transmission is a stepless hydrostatic-mechanical power split drive. It is envisaged that any other kind of transmission system may be used, such as:
- a combustion engine and a stepped shift transmission with hydraulic/electric shift means;
- an electric drive system having a combustion engine and an electrical-mechanical power split drive;
- an electric drive system having a combustion engine and an electric motor replacing a central transmission;
- an electric drive system having a combustion engine and an electric motor related to at least two wheel hubs.

As all these transmission systems are capable of adjusting engine speed and accordingly the speed of the drive/wheels to reduce fuel consumption they all fall within the scope of the invention.

The invention claimed is:

1. An engine control system for changing engine speed on an agricultural vehicle, said engine control system comprising a vehicle control unit for controlling an engine and a transmission mounted within the vehicle and a tyre pressure control unit monitoring a desired pressure value of at least one tyre, and wherein the tyre pressure control unit signals the vehicle control unit to automatically increase an engine speed as a result of an increase of the desired tyre pressure value.

2. The engine control system as claimed in claim 1 wherein the tyre control pressure unit is connected to a tyre pressure valve.

3. The engine control system as claimed in claim 1 wherein the tyre pressure control unit is integrated within the vehicle control unit.

4. The engine control system as claimed in claim 1 wherein the increase of the desired tyre pressure value causes the engine control system to automatically de-activate a mode of vehicle operation selected by a vehicle operator, said mode simultaneously controlling the engine and transmission to reduce fuel consumption whilst keeping a constant vehicle speed and wherein said de-activation reduces time to inflate the tyre to the tyre pressure value.

5. The engine control system according to claim 4, wherein the vehicle control unit registers whether a specified mode of operation is activated and the tyre pressure control unit checks with the vehicle control system to determine if an operator selected mode is activated and de-activates the engine control system if an operator selected mode is activated.

6. The engine control system according to claim 4 wherein upon reaching the tyre pressure value the engine speed is reduced to the speed it was before the operator selected mode was de-activated.

7. The engine control system as claimed in claim 1 wherein the increase of the desired tyre pressure value causes the engine control system to automatically de-activate a mode of vehicle operation selected by the vehicle operator, said mode allowing the engine speed to be reduced in response to a load on the engine until a specified speed is reached before shifting to a further gear or adjusting a gear ratio, and wherein said de-activation prevents an adverse change in engine speed as the result of the increased tyre pressure value.

8. The engine control system as claimed in claim 1 wherein the increase of the desired tyre pressure value causes the engine control system to automatically de-activate a mode of vehicle operation selected by the vehicle operator in which a PTO is in use, wherein said de-activation prevents an adverse change in engine speed as the result of the increased tyre pressure value.

9. The engine control system as claimed in claim 1 wherein the increase of the desired tyre pressure value causes the engine control system to automatically de-activate a mode of vehicle operation selected by the vehicle operator in which the vehicle is in a coast mode, wherein said de-activation prevents undesired acceleration of the agricultural vehicle.

* * * * *